United States Patent
Banhos et al.

(10) Patent No.: US 11,371,390 B2
(45) Date of Patent: Jun. 28, 2022

(54) ASSEMBLIES FOR TRANSFERRING COMPRESSIVE LOADS IN FLANGES OF COMPOSITE GAS TURBINE ENGINE COMPONENTS

(71) Applicant: Raytheon Technologies Corporation, Farmington, CT (US)

(72) Inventors: Jonas S. Banhos, Rocky Hill, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 138 days.

(21) Appl. No.: 16/856,499

(22) Filed: Apr. 23, 2020

(65) Prior Publication Data

US 2021/0332721 A1 Oct. 28, 2021

(51) Int. Cl.
*F01D 25/24* (2006.01)

(52) U.S. Cl.
CPC ........ *F01D 25/243* (2013.01); *F05D 2230/60* (2013.01); *F05D 2250/75* (2013.01); *F05D 2260/31* (2013.01); *F05D 2300/603* (2013.01)

(58) Field of Classification Search
CPC ...... F01D 25/24; F01D 25/243; F01D 25/265; F05D 2260/31; F05D 2300/603
See application file for complete search history.

(56) References Cited

U.S. PATENT DOCUMENTS

| | | | |
|---|---|---|---|
| 4,702,498 A | 10/1987 | Mueller et al. | |
| 8,079,773 B2 * | 12/2011 | Blanton | F16L 47/14 403/335 |
| 8,206,102 B2 | 6/2012 | Moon | |
| 8,475,895 B2 | 7/2013 | Xie | |
| 9,279,531 B2 | 3/2016 | Parkin et al. | |
| 9,399,315 B2 | 7/2016 | Plante et al. | |
| 10,221,718 B2 | 3/2019 | Clarkson et al. | |
| 2008/0060755 A1 | 3/2008 | Blanton et al. | |
| 2008/0157418 A1 | 7/2008 | Blanton et al. | |
| 2010/0000227 A1 * | 1/2010 | Porte | B64D 33/02 60/796 |

(Continued)

FOREIGN PATENT DOCUMENTS

| | | |
|---|---|---|
| EP | 1777377 | 4/2007 |
| EP | 2038532 | 3/2009 |

(Continued)

OTHER PUBLICATIONS

European Search Report for European Patent Application No. 21170284.0 dated Oct. 14, 2021.

*Primary Examiner* — David E Sosnowski
*Assistant Examiner* — Maxime M Adjagbe
(74) *Attorney, Agent, or Firm* — Carlson, Gaskey & Olds, P.C.

(57) ABSTRACT

An assembly for a gas turbine engine according to an example of the present disclosure includes, among other things, a composite gas turbine engine component including a first flange extending radially from a main body at a junction having an arcuate profile. An adapter ring includes a mate face dimensioned to follow a contour of the junction such that the junction sits on the mate face. A method of assembly for a gas turbine engine is also disclosed.

21 Claims, 5 Drawing Sheets

(56) References Cited

U.S. PATENT DOCUMENTS

| | | | | |
|---|---|---|---|---|
| 2013/0309085 A1* | 11/2013 | Panayil | ............... | F04D 29/644 415/214.1 |
| 2015/0308290 A1* | 10/2015 | Kappes | ............... | F01D 25/24 415/119 |
| 2016/0201505 A1* | 7/2016 | Clarkson | ............... | F01D 25/243 415/200 |
| 2018/0200967 A1 | 7/2018 | Sutter et al. | | |

FOREIGN PATENT DOCUMENTS

| | | |
|---|---|---|
| EP | 2434105 | 3/2012 |
| EP | 2932053 | 10/2015 |
| EP | 3026224 | 1/2019 |

* cited by examiner

ASSEMBLIES FOR TRANSFERRING COMPRESSIVE LOADS IN FLANGES OF COMPOSITE GAS TURBINE ENGINE COMPONENTS

BACKGROUND

This disclosure relates to a gas turbine engine, and more particularly to gas turbine engine components having flanges.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The engine typically includes one or more ducts that convey airflow through a gas path of the engine. Some ducts may be made of a composite material and may have one more flanges for mounting the duct to another component.

SUMMARY

An assembly for a gas turbine engine according to an example of the present disclosure includes a composite gas turbine engine component including a first flange extending radially from a main body at a junction having an arcuate profile, a stiffener ring between the first flange and a second flange, and an adapter ring trapped between the stiffener ring and the first flange. The adapter ring includes a mate face dimensioned to follow a contour of the junction such that the junction sits on the mate face.

In a further embodiment of any of the foregoing embodiments, the adapter ring is metallic.

In a further embodiment of any of the foregoing embodiments, the second flange is metallic.

A further embodiment of any of the foregoing embodiments includes at least one fastener extending through the stiffener ring and the adapter ring to fixedly attach the first and second flanges.

A further embodiment of any of the foregoing embodiments includes a mounting block arranged such that the first flange is trapped between the mounting block and the adapter ring.

In a further embodiment of any of the foregoing embodiments, the mounting block includes a contoured face dimensioned to follow the contour of the junction such that the contoured face is opposed to the mate face.

In a further embodiment of any of the foregoing embodiments, the first gas turbine engine component is made of a composite layup including a plurality of ply layers in stacked relationship that follow the contour of the junction to establish the main body and the first flange.

In a further embodiment of any of the foregoing embodiments, the ply layers establish an intermediate portion interconnecting the main body and the junction, and the ply layers are arranged such that the ply layers slope radially inward from the main body in a direction towards the junction.

In a further embodiment of any of the foregoing embodiments, the ply layers are arranged in the stacked relationship to establish a J-shaped geometry comprising the junction.

In a further embodiment of any of the foregoing embodiments, the first gas turbine engine component is a composite duct is dimensioned to bound a gas path of a gas turbine engine.

A gas turbine engine according to an example of the present disclosure includes a fan section, a compressor section, a turbine section that drives the fan section and the compressor section, and a duct assembly including a first duct that has a main body and a first flange. The main body extends along an engine longitudinal axis to bound a gas path. The first flange extends radially outwardly from the main body at a junction having an arcuate profile. The first duct is made of a composite layup including a plurality of ply layers in stacked relationship that follow a contour of the junction to establish the first main body and the first flange. A second duct includes a second flange, and an interface ring trapped between the first and second flanges. The first flange sits on the interface ring along the contour.

In a further embodiment of any of the foregoing embodiments, the first duct is a split duct including first and second duct halves circumferentially distributed in an array about the engine longitudinal axis to bound the gas path.

In a further embodiment of any of the foregoing embodiments, the ply layers establish an intermediate portion interconnecting the main body and the junction, and the ply layers are arranged such that the ply layers slope radially inwardly from the main body in a direction towards the junction with respect to the engine longitudinal axis.

In a further embodiment of any of the foregoing embodiments, the interface ring is metallic.

In a further embodiment of any of the foregoing embodiments, the interface ring is trapped between the first flange and a stiffener ring of the duct assembly.

In a further embodiment of any of the foregoing embodiments, the stiffener and interface rings are metallic. A thickness of the stiffener ring is greater than a combined thickness of the first and second flanges with respect to the engine longitudinal axis.

A method of assembly for a gas turbine engine according to an example of the present disclosure includes positioning an interface ring between a first flange of a first duct and a second flange of a second duct. The first and second ducts cooperate to bound a gas path of the gas turbine engine. The first flange extends radially outwardly from a duct body at a junction having an arcuate profile. The first duct includes a composite layup having a plurality of ply layers in stacked relationship that follow a contour of the junction. The interface ring includes a mate face dimensioned to follow the contour of the junction such that the ply layers are supported on the mate face.

In a further embodiment of any of the foregoing embodiments, the first duct is a split duct including first and second duct halves circumferentially distributed in an array about an engine longitudinal axis of the gas turbine engine.

In a further embodiment of any of the foregoing embodiments, the positioning step occurs such that the interface ring is trapped between the first flange and a metallic stiffener ring having thickness that is greater than a thickness of the interface ring, and the method further includes fixedly attaching the first and second flanges with at least one fastener that extends through the interface ring and the stiffener ring.

In a further embodiment of any of the foregoing embodiments, the ply layers are arranged in the stacked relationship to establish a J-shaped geometry comprising the junction.

The various features and advantages of this disclosure will become apparent to those skilled in the art from the following detailed description. The drawings that accompany the detailed description can be briefly described as follows.

DETAILED DESCRIPTION

Figure 1A:
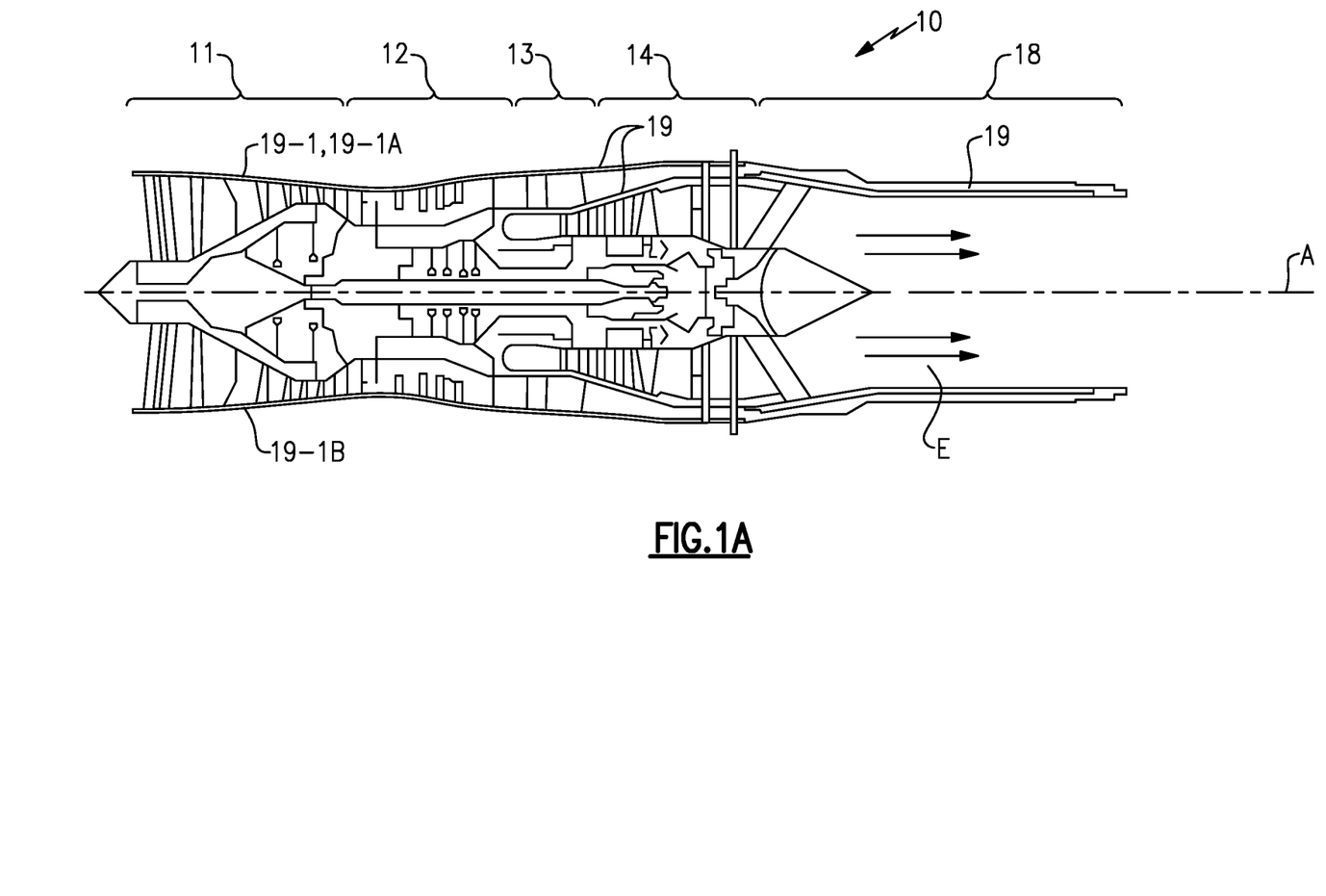
FIG. 1A illustrates an example gas turbine engine.

Referring to FIG. 1A, a gas turbine engine 10 includes a fan section 11, a compressor section 12, a combustor section 13, and a turbine section 14. Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. The hot exhaust stream E is expanded through the turbine section 14 to drive the fan section 11 and the compressor section 12. The exhaust gasses E flow from the turbine section 14 through an exhaust liner assembly 18.

The engine 10 includes one or more ducts 19 arranged about an engine central longitudinal axis A. The ducts 19 are dimensioned to bound a gas path of the engine 10, such as through the fan, compressor, and turbine sections 11, 12, 14 and the exhaust liner assembly 18. In the illustrative example of FIG. 1A, the engine 10 includes a first duct 19-1 that bounds a portion of the gas path through the fan section 11. The duct 19-1 includes a pair of duct halves (indicated at 19-1A, 19-1B) that establish a "split" duct circumferentially distributed and arranged in an array about the longitudinal axis A to bound the gas path.

Figure 1B:
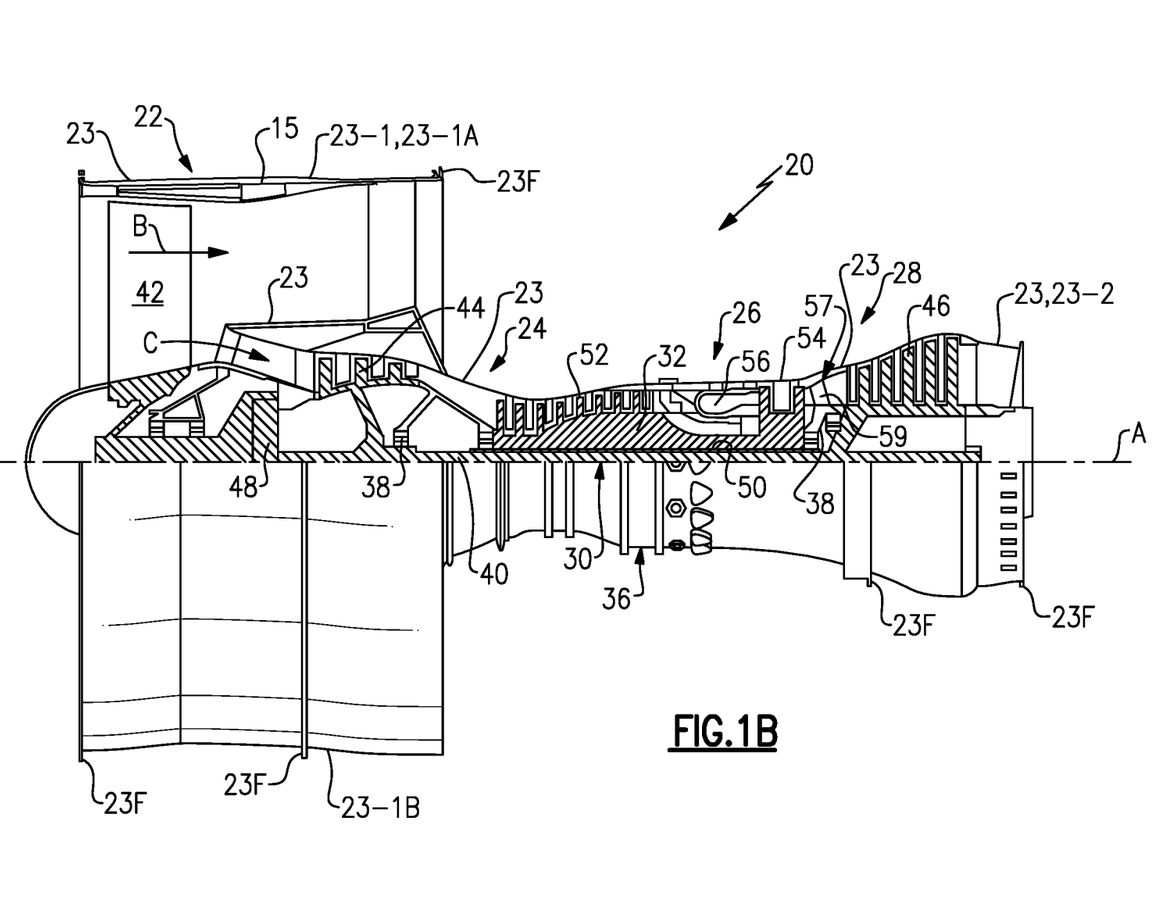
FIG. 1B illustrates another example gas turbine engine.

FIG. 1B schematically illustrates a gas turbine engine 20 according to another example. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

The engine 20 includes one or more ducts 23 arranged about the engine central longitudinal axis A. The ducts 23 are dimensioned to bound a gas path of the engine 20, such as the bypass flow path B through the fan section 22 and the core flow path C through the compressor and turbine sections 24, 28. Each duct 23 can include one or more flanges 23F dimensioned to mount the duct 23 to another component, such as another one of the ducts 23, or a nacelle or cowling. In the illustrative example of FIG. 1B, a first duct 23-1 establishes at least a portion of the housing 15. The first duct 23-1 bounds a flow path through the fan section 22, such as the bypass flow path B. The duct 23-1 includes a pair of duct halves (indicated at 23-1A, 23-1B) arranged about the longitudinal axis A. Another one of the ducts 23-2 can be incorporated in a turbine exhaust case (TEC) of the turbine section 28, for example.

Figure 2:
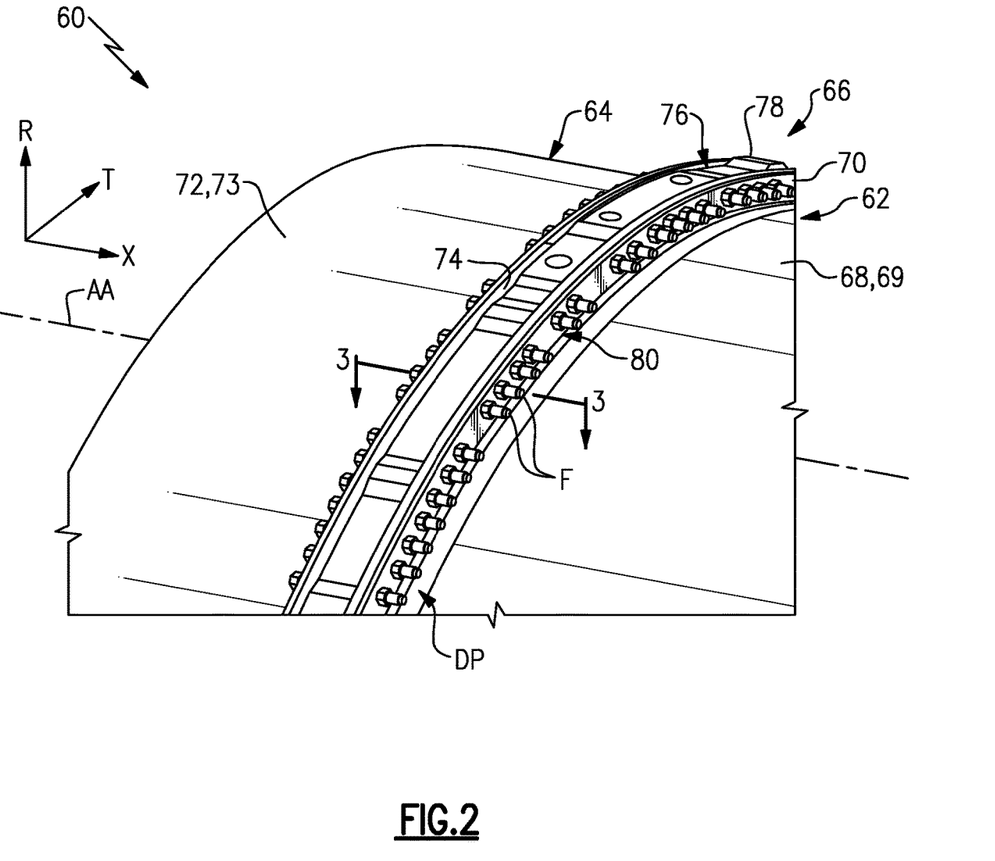
FIG. 2 illustrates a perspective view of an assembly including components coupled along a flanged interface.
Figure 3:
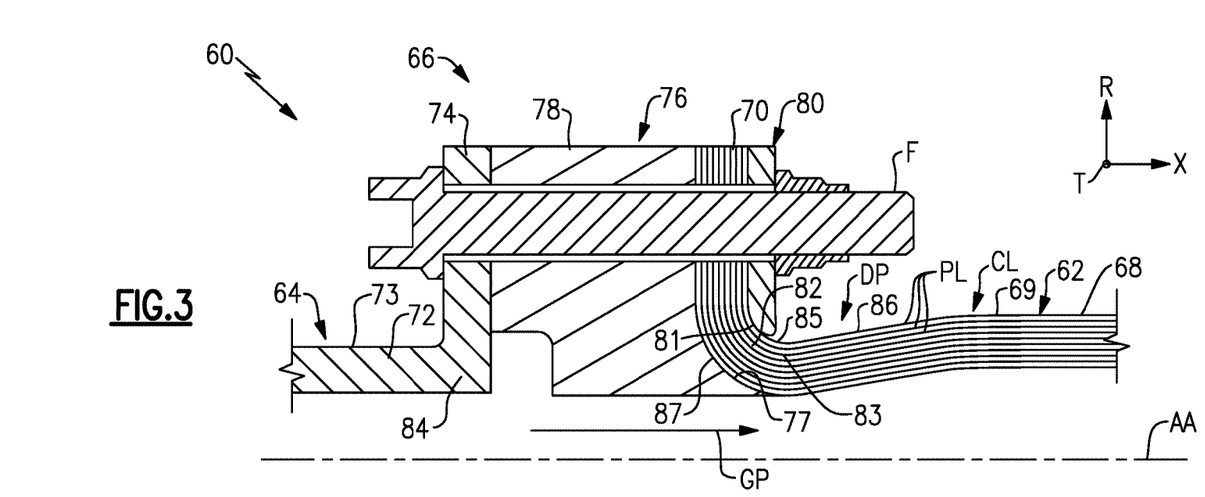
FIG. 3 illustrates a sectional view of the assembly taken along line 3-3 of FIG. 2.

FIGS. 2-3 illustrate an exemplary assembly 60 for a gas turbine engine. The assembly 60 can be incorporated into a portion of the gas turbine engines 10, 20 such as one of the ducts 19, 23, for example. Although the disclosed examples primarily refer to ducts, other gas turbine engine components and other systems can benefit from teachings disclosed herein, including composite casings and other structures having a flanged interface and systems lacking a fan for propulsion.

The assembly 60 includes a first gas turbine engine component 62 and a second gas turbine engine component 64. In the illustrative example of FIGS. 2-3, the assembly 60 is a duct assembly, the first component 62 is a first duct, and the second component 64 is a second duct. Each duct 62, 64 can be a split duct including a pair of duct halves circumferentially distributed and arranged in an array about a longitudinal axis to bound a gas path, as illustrated by the duct 19 of FIG. 1A. The first and second components 62, 64 are fixedly attached or otherwise secured at a flanged interface 66. The first component 62 includes a first main (or duct) body 68 and a first flange 70. The second component 64 includes a second main (or duct) body 72 and a second flange 74.

The main bodies 68, 72 of the first and second components 62, 64 extend along and about a longitudinal axis AA and cooperate to bound a gas path GP (FIG. 3). The longitudinal axis AA can be collinear with or parallel to with the engine longitudinal axis A of the engines 10, 20. The first and second flanges 70, 74 are arcuate or ring-shaped and are dimensioned to follow a circumference 69, 73 of the respective main bodies 68, 72 to at least partially or completely extend about the longitudinal axis AA to bound respective portions of the gas path GP.

The assembly 60 includes at least one interface ring 76 trapped or positioned between the flanges 70, 74. The interface ring 76 is dimensioned to extend at least partially or completely about the longitudinal axis AA. In the illustrative example of FIGS. 2-3, the interface ring 76 is a stiffener ring 78 trapped or positioned between the flanges 70, 74. The stiffener ring 78 can serve to provide increased rigidity and reduced deflection of the flanges 70, 74 along the flanged interface 66.

The assembly 60 includes at least one mounting block (or ring) 80 outward of the first flange 70. The mounting block 80 is arranged such that the first flange 70 is trapped between the mounting block 80 and the interface ring 76. The assembly 60 includes one or more fasteners F that fixedly attach the flanges 70, 74 to the interface ring 76. Example fasteners include bolts, screws, clips, pins and rivets. In the illustrative example of FIGS. 2-3, the fasteners F are bolts that mate with respective nuts. At least one fastener F extends through respective bores in the interface/stiffener ring 76/78 to fixedly attach the flanges 70, 74, as illustrated in FIG. 3.

Referring to FIG. 3, with continuing reference to FIG. 2, the main bodies 68, 72 extend in an axial (or first direction) X relative to the longitudinal axis AA. The main bodies 68, 72 extend in a circumferential (or second) direction T relative to the longitudinal axis AA, as illustrated in FIG. 2. The first flange 70 is an "unturned" flange that extends outwardly in a radial (or third) direction R from the first main body 68 at a first junction (or elbow) 82. The second flange 74 extends outwardly in the radial direction R from the second main body 72 at a second junction (or elbow) 84. The flanges 70, 74 extend in the circumferential direction T about the longitudinal axis AA, as illustrated in FIG. 2. It should be understood that the components 62, 64 including the respective flanges 70, 74 can be arranged at other orientations relative to the axes X, T and/or R in view of the teachings disclosed herein. For example, the flanges 70, 74 can be dimensioned to extend radially inwardly in the radial direction R from the respective main bodies 68, 72 to establish the flanged interface 66. In other examples, the flanges 70, 74 are dimensioned to extend axially parallel along the respective main bodies 68, 72 relative to the longitudinal axis AA.

The first and second junctions 82, 84 can have various geometries or profiles. The geometry of the first and second junctions 82, 84 can be the same or can differ. In the illustrative example of FIG. 3, the first junction 82 has a substantially arcuate geometry or profile, and the second junction 84 has a substantially perpendicular geometry or profile. For the purposes of this disclosure, the term "substantially" means ±10% of the disclosed relationship or value unless otherwise stated.

Various materials can be utilized to form each of the first and second components 62, 64, interface/stiffener ring 76/78 and mounting block 80. The first and/or second components 62, 64 including the first and second flanges 70, 74 can be made of metallic materials such as steel, nickel, aluminum and alloys or can be non-metallic materials such monolithic ceramics and composites including any of the composite materials disclosed herein.

In the illustrative example of FIG. 3, the first component 62 is a composite duct made of a composite layup CL. The composite layup CL includes a plurality of ply layers PL in stacked relationship that follow a contour 83 of the first junction 82 to establish at least a portion of the first main body 68 and the first flange 70. The component 62 is radiused along the contour 83 such that the junction 82 has a substantially arcuate profile, as illustrated in FIG. 3. The contour 83 defines a concave (or inner) face 85 and a convex (or outer) face 87 on opposed sides of the junction 82. The faces 85, 87 of the junction 82 establish a substantially smooth transition between surfaces of the main body 68 and the first flange 70. In illustrative example of FIG. 3, one of the ply layers PL extends along the concave face 85 and another one of the ply layers PL extends along the convex face 87, and the ply layers PL are arranged such that the flange 70 is substantially perpendicular to the main body 68.

The ply layers CL can be arranged to establish an intermediate portion 86 interconnecting the first main body 68 and the first junction 82. The ply layers PL are arranged such that the ply layers PL slope radially inwardly from the first main body 68 in the radial direction R towards an adjacent portion of the first junction 82 with respect to the longitudinal axis AA, as illustrated in FIG. 3. The ply layers CL are arranged in the stacked relationship to establish a generally J-shaped cross-sectional geometry including the first junction 82. The arrangement of ply layers PL along the intermediate portion 86 establishes a depression DP extending in the circumferential direction T about the circumference 69 of the first component 62.

Various materials can be utilized to form the composite layup CL including the ply layers PL. For examples, the composite layup CL can be constructed from continuous and/or discontinuous fibers arranged in various orientations and in one or more ply layers PL based on structural requirements. Example fiber materials include fiberglass, an aramid such as Kevlar®, a ceramic such as Nextel™, and a polyethylene such as Spectra®. The ply layers PL can be constructed from uni-tape plies having a plurality of fibers oriented in the same direction or can be constructed from a two-dimensional and/or three-dimensional network of fibers, which can be woven or interlaced. Other example fiber constructions include a network of stitched or non-crimped fabrics. The network of fibers can be formed from a dry fiber preform, or can be formed from a pre-impregnated ("prepreg") fabric or tape having fibers pre-impregnated with resin in a matrix, for example. In other examples, the fibers are infused with resin in a matrix subsequent to laying up the ply layers PL on a layup tool. In examples, the composite layup CL is made of an organic matric composites (OMC) or a ceramic matrix composites (CMC) including fibers in a matrix material. One or more coatings can be applied to surfaces of the composite layup CL.

The interface ring 76 can be dimensioned such that the first flange 70 sits on or is otherwise supported by the interface ring 76 along the junction 82. In the illustrative example of FIG. 3, the interface ring 76 includes a radial feature or portion that establishes a contoured mate face (or seat) 77. The mate face 77 is dimensioned to substantially follow or complement the convex face 87 of the contour 83 such that the junction 82 of the flange 70 sits on or is otherwise supported on the mate face 77 in an installed position. The first flange 70 and mate face 77 are at least partially axially aligned along the junction 82 with respect to the longitudinal axis AA. Contouring of the mate face 77 can be utilized to omit "corner filler" plies that may otherwise be incorporated into the composite layup CL to fill a space between the flange and adjacent component, and can be utilized to reduce any secondary machining operations on surfaces of the flange 70.

The mounting block 80 includes a contoured block face 81 extending along an inner diameter of the mounting block 80. The block face 81 is dimensioned to substantially follow or complement the concave face 85 of the contour 83 such that the block face 81 of the mounting block 80 is opposed to the mate face 77 of the interface ring 76.

Figure 4:
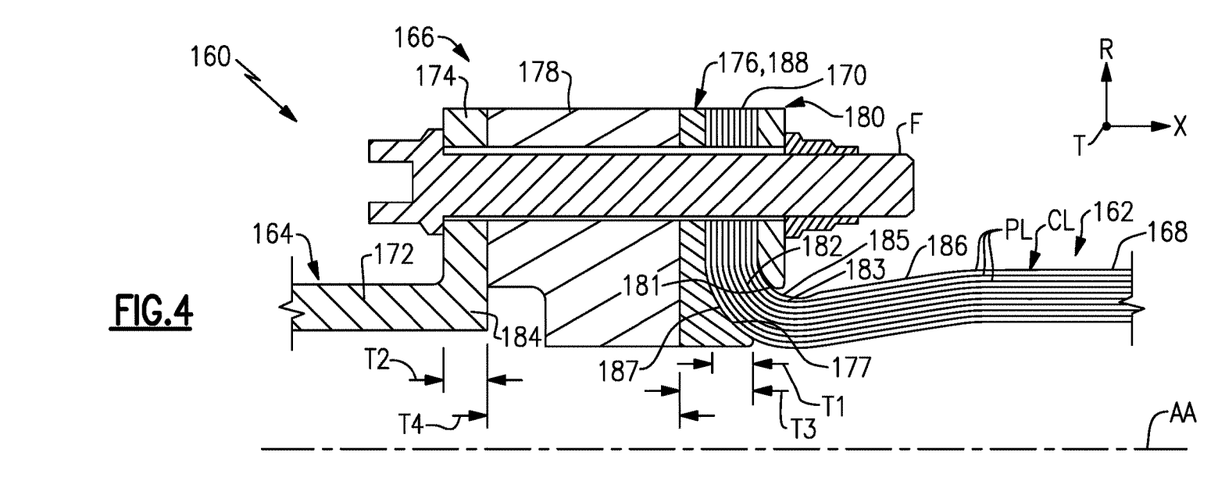
FIG. 4 illustrates a sectional view of an assembly according to another example.

Other arrangements can be utilized to couple the flanges. FIG. 4 illustrates an assembly 160 for a gas turbine engine according to another example. In this disclosure, like reference numerals designate like elements where appropriate and reference numerals with the addition of one-hundred or multiples thereof designate modified elements that are understood to incorporate the same features and benefits of the corresponding original elements.

The assembly 160 includes a first gas turbine engine component 162 and a second gas turbine engine component 164 including respective flanges 170, 174 that establish a flanged interface 166. The assembly 160 includes a stiffener ring 178 and includes an adapter ring 188 that serves as an interface ring 176. The stiffener ring 178 and adapter ring 188 are separate and distinct components. The adapter ring 188 is trapped or positioned between the stiffener ring 178 and flange 170. A mounting block (or ring) 180 is arranged such that the flange 170 is trapped or positioned between the mounting block 180 and interface/adapter ring 176/188. The rings 178, 188 and mounting block 180 can be segmented or can be a full hoop dimensioned to extend circumferentially about the longitudinal axis AA.

At least one fastener F extends through respective bores in the stiffener ring 178 and adapter ring 188 to fixedly attach the flanges 170, 174. The stiffener and adapter rings 178, 188 can be made of any of the materials disclosed herein, including metallic materials. The material of the stiffener ring 178 can be the same as or can differ from the material of the adapter ring 188. The stiffener and/or adapter rings 178, 188 can be separately machined, which may reduce any secondary machining operations on the flanges 170, 174.

The adapter ring 188 includes a contoured mate face 177 dimensioned to follow a contour 183 of a first junction 182 of the flange 170 such that the junction 182 sits on or is otherwise supported by the mate face 177 in an installed position.

The stiffener ring 178 can be dimensioned to establish a predefined rigidity along the flanged interface 166 and to maintain a relatively truer roundness of the assembly 160 during engine operation. The first flange 170 establishes a first thickness T1. The second flange 174 establishes a second thickness T2. The adapter ring 188 establishes a third thickness T3. The stiffening ring 178 establishes a fourth thickness T4. The thicknesses T1-T4 are maximum values that can be taken relative to the longitudinal axis AA. The assembly 160 can be dimensioned such that the thickness T4 of the stiffener ring 178 is greater than any of the thicknesses T2, T3 and/or T4. In examples, the thickness T4 of the stiffener ring 178 is greater than a combined thickness T1, T2 of the first and second flanges 170, 174 with respect to the longitudinal axis AA.

Figure 5:
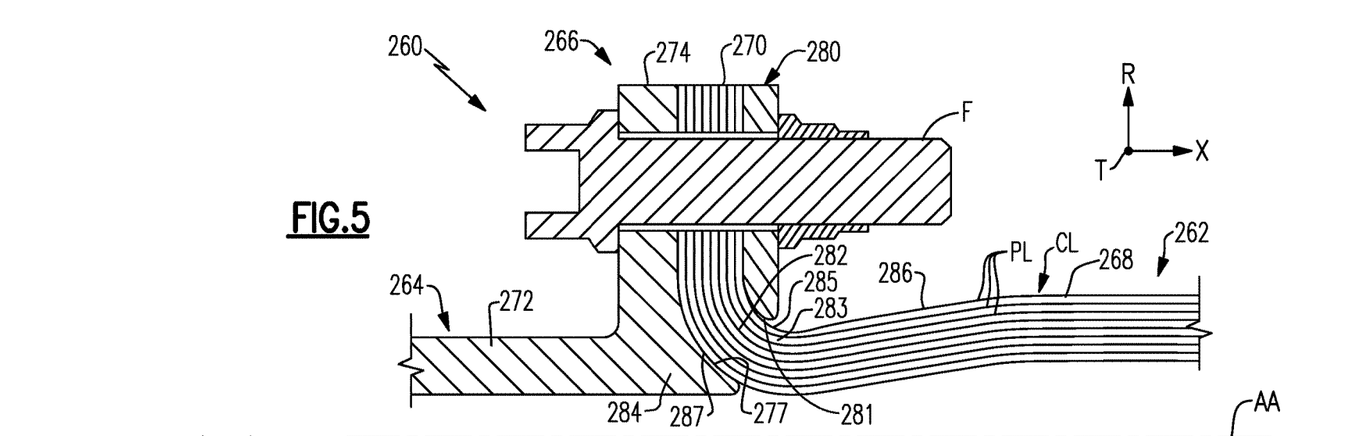
FIG. 5 illustrates a sectional view of an assembly according to yet another example.

FIG. 5 illustrates an assembly 260 for a gas turbine engine according to another example. The assembly 260 includes a first gas turbine engine component 262 and a second gas turbine engine component 264 including respective flanges 270, 274 that establish a flanged interface 266. In the illustrative example of FIG. 5, features of the various interface rings disclosed herein are incorporated into the second component 264. The second component 264 includes a contoured mate face 277. The first flange 270 sits on or is otherwise supported by the mate face 277 along a contour 283 of a first junction 282. The flanges 270, 274 directly abut against each other and are fixedly attached with at least one fastener F.

The assembly 60/160/260 can be assembled as follows to establish the flanged interfaces 66/166/266. The interface ring 76/176 is positioned between the flanges 70/170, 74/174. In the example of FIG. 3, the stiffener ring 78 serves as the interface ring 76. The flanges 70, 74 are fixedly attached with at least one fastener F that extends through the stiffener ring 78 to establish the flanged interface 66. In the illustrative example of FIG. 4, the adapter ring 188 serves as the interface ring 176, and the positioning occurs such that the adapter ring 176 is trapped between the first flange 170 and stiffener ring 178. The first and second flanges 170, 174 are fixedly attached with at least one fastener F that extends through the adapter ring 188 and stiffener ring 178 to establish the flanged interface 166. In the illustrative example of FIG. 5, the flanges 270, 274 are positioned in direct abutment, and at least one fastener F is placed through the flanges 270, 274 to fixedly attach the components 262, 264.

Figure 6:
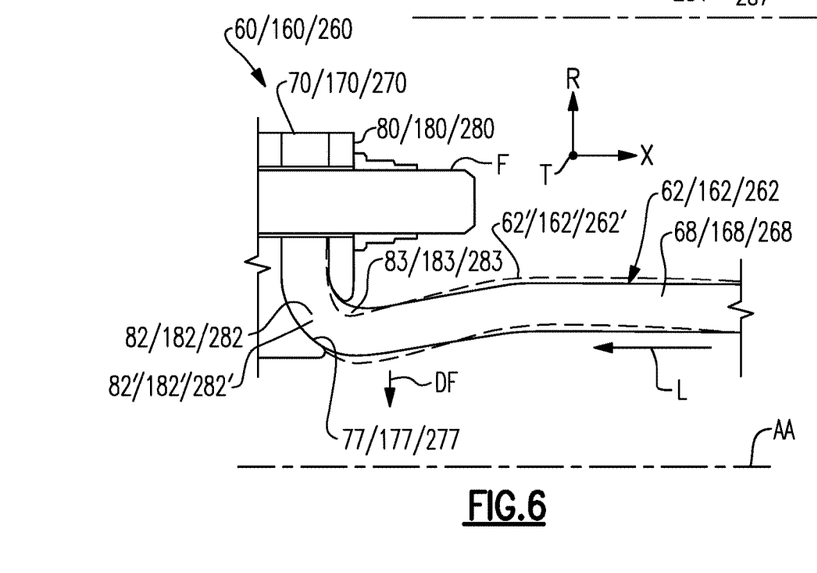
FIG. 6 illustrates a sectional view of an assembly subject to a compressive load.
Figure 7:
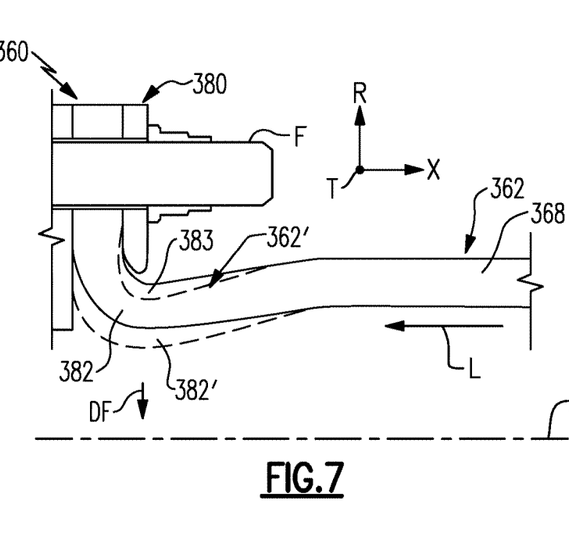
FIG. 7 illustrates a sectional view of another assembly subject to a compressive load.

FIGS. 6 and 7 illustrate displacement of the disclosed assemblies 60/160/260 as compared to another assembly 360. The assembly 60/160/260 of FIG. 6 includes the mate face 77/177/277 contacting the junction 82/182/282. The assembly 360 lacks an adapter face such that convex surfaces along the respective junction 382 are exposed and do not contact an adjacent component of the assembly 360. An axial compressive load L is applied to each of the main bodies 68/168/268, 368. The compressive load L can be substantially in the axial direction X and causes the respective components 62/162/262, 362 to compress between the main bodies 68/168/268, 368 and respective flanges 70/170/270, 370. At least a portion of the compressive load L is transferred between the respective flanges 70/170/270, 370 and 74/174/274, 374.

The compressive load L may cause the components 62/162/262, 362 to yield or displace in a direction DF adjacent the respective junctions 82/182/282, 382. The direction DF of displacement can substantially extend in the radial direction R. The radial displacement of the component 62'/162'/262' of FIG. 6 and the component 362' of FIG. 7 is shown in dashed lines for illustrative purposes. The mate face 77/177/277 serves to establish a radial compression zone that opposes radial deflection of the respective flange 70/170/270.

The disclosed assemblies 60/160/260 can improve transfer compressive axial loads between flanges 70/170/270, 74/174/274 in a manner that reduces radial deflection and bending. As illustrated in FIGS. 6-7, the junction 82/182/282 has a lesser amount of radial deflection, which can reduce localized stress concentrations in the flange 70/170/270 and junction 82/182/282 and reduce a likelihood of delamination of the composite layup. The reduced deflection can improve durability and can improve relative alignment with adjacent components, which may improve overall efficiency during engine operation.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
   a composite gas turbine engine component including a first flange extending radially from a main body at a junction having an arcuate profile;
   a stiffener ring between the first flange and a second flange;
   an adapter ring trapped between the stiffener ring and the first flange, the adapter ring including a concave mate face dimensioned to follow a contour of the junction such that a convex junction face of the junction sits on the mate face; and
   wherein the first gas turbine engine component is made of a composite layup including a plurality of ply layers in stacked relationship that follow the contour of the junction to establish the main body and the first flange.

2. The assembly as recited in claim 1, wherein the adapter ring is metallic.

3. The assembly as recited in claim 2, wherein the second flange is metallic.

4. The assembly as recited in claim 1, further comprising at least one fastener extending through the stiffener ring and the adapter ring to fixedly attach the first and second flanges.

5. The assembly as recited in claim 1, further comprising a mounting block arranged such that the first flange is trapped between the mounting block and the adapter ring.

6. The assembly as recited in claim 5, wherein the mounting block includes a contoured face dimensioned to follow a concave junction face of the contour of the junction such that the contoured face is opposed to the mate face.

7. The assembly as recited in claim 1, wherein the ply layers establish an intermediate portion interconnecting the main body and the junction, and the ply layers are arranged such that the ply layers slope radially inward from the main body in a direction towards the junction to establish a depression in an outer face of the main body.

8. The assembly as recited in claim 1, wherein:
   the ply layers are arranged in the stacked relationship to establish a J-shaped geometry comprising the junction; and
   an external surface contour of the J-shaped geometry follows a first face of the first flange, a concave junction face of the junction, and a surface depression interconnecting the concave junction face and an outer face of the main body.

9. The assembly as recited in claim 1, wherein the first gas turbine engine component is a composite duct is dimensioned to bound a gas path of the gas turbine engine.

10. A gas turbine engine comprising:
    a fan section;
    a compressor section;
    a turbine section that drives the fan section and the compressor section; and
    a duct assembly comprising:
    a first duct including a main body and a first flange, the main body extending along an engine longitudinal axis to bound a gas path, the first flange extending radially outwardly from the main body at a junction having an arcuate profile, wherein the first duct is made of a composite layup including a plurality of ply layers in stacked relationship that follow a contour of the junction to establish the first main body and the first flange;
a second duct including a second flange; and
an interface ring trapped between the first and second flanges, wherein the first flange sits on a concave mate face of the interface ring along a convex junction face of the contour.

11. The gas turbine engine as recited in claim 10, wherein the first duct is a split duct including first and second duct halves circumferentially distributed in an array about the engine longitudinal axis to bound the gas path.

12. The gas turbine engine as recited in claim 11, wherein the ply layers establish an intermediate portion interconnecting the main body and the junction, and the ply layers are arranged such that the ply layers slope radially inwardly from the main body in a direction towards the junction with respect to the engine longitudinal axis.

13. The gas turbine engine as recited in claim 12, wherein:
the interface ring is trapped between the first flange and a stiffener ring of the duct assembly;
the stiffener and interface rings are metallic, and a thickness of the stiffener ring is greater than a combined thickness of the first and second flanges with respect to the engine longitudinal axis;
the main body includes a radially outer face and a radially inner face on opposite sides of the main body, and the radially inner face is arranged to face toward the engine longitudinal axis;
the ply layers are arranged in the stacked relationship to establish a J-shaped geometry comprising the junction;
the first duct is radiused along the contour of the junction such that the junction has a substantially arcuate profile, the contour of the junction defines the convex junction face and a concave junction face on opposite sides of the junction;
an external surface contour of the J-shaped geometry follows a first face of the first flange, the concave junction face, and a surface depression interconnecting the concave junction face and the radially outer face of the main body;
a radially outer face of the intermediate portion extends inwardly from the radially outer face of the main body to the depression such that the surface depression is radially inward of the radially outer face of the main body with respect to the engine longitudinal axis; and
a radially inner face of the intermediate portion extends radially inward from the radially inner face of the main body to the convex junction face with respect to the engine longitudinal axis.

14. The gas turbine engine as recited in claim 13, further comprising:

a mounting block arranged such that the first flange is trapped between the mounting block and the interface ring; and
wherein the mounting block includes a contoured face dimensioned to follow the concave junction face at the depression such that the contoured face is opposed to the concave mate face of the interface ring.

15. The gas turbine engine as recited in claim 10, wherein the interface ring is metallic.

16. The gas turbine engine as recited in claim 10, wherein the interface ring is trapped between the first flange and a stiffener ring of the duct assembly.

17. The gas turbine engine as recited in claim 16, wherein the stiffener and interface rings are metallic, and wherein a thickness of the stiffener ring is greater than a combined thickness of the first and second flanges with respect to the engine longitudinal axis.

18. A method of assembly for a gas turbine engine comprising:
positioning an interface ring between a first flange of a first duct and a second flange of a second duct, wherein the first and second ducts cooperate to bound a gas path of the gas turbine engine;
wherein the first flange extends radially outwardly from a duct body at a junction having an arcuate profile;
wherein the first duct includes a composite layup having a plurality of ply layers in stacked relationship that follow a contour of the junction; and
wherein the interface ring includes a concave mate face dimensioned to follow a convex junction face of the contour of the junction such that the ply layers are supported on the concave mate face.

19. The method as recited in claim 18, wherein the first duct is a split duct including first and second duct halves circumferentially distributed in an array about an engine longitudinal axis of the gas turbine engine.

20. The method as recited in claim 18, wherein the positioning step occurs such that the interface ring is trapped between the first flange and a metallic stiffener ring having thickness that is greater than a thickness of the interface ring, and further comprising:
fixedly attaching the first and second flanges with at least one fastener that extends through the interface ring and the stiffener ring.

21. The method as recited in claim 20, wherein:
the ply layers are arranged in the stacked relationship to establish a J-shaped geometry comprising the junction; and
wherein an external surface contour of the J-shaped geometry follows a first face of the first flange, a concave junction face of the junction, and a surface depression interconnecting the concave junction face and an outer face of the duct body.

* * * * *